No. 821,105. PATENTED MAY 22, 1906.
O. KITCHELL & C. W. SWANSON.
DISH WASHING MACHINE.
APPLICATION FILED JUNE 17, 1905.
2 SHEETS—SHEET 1.
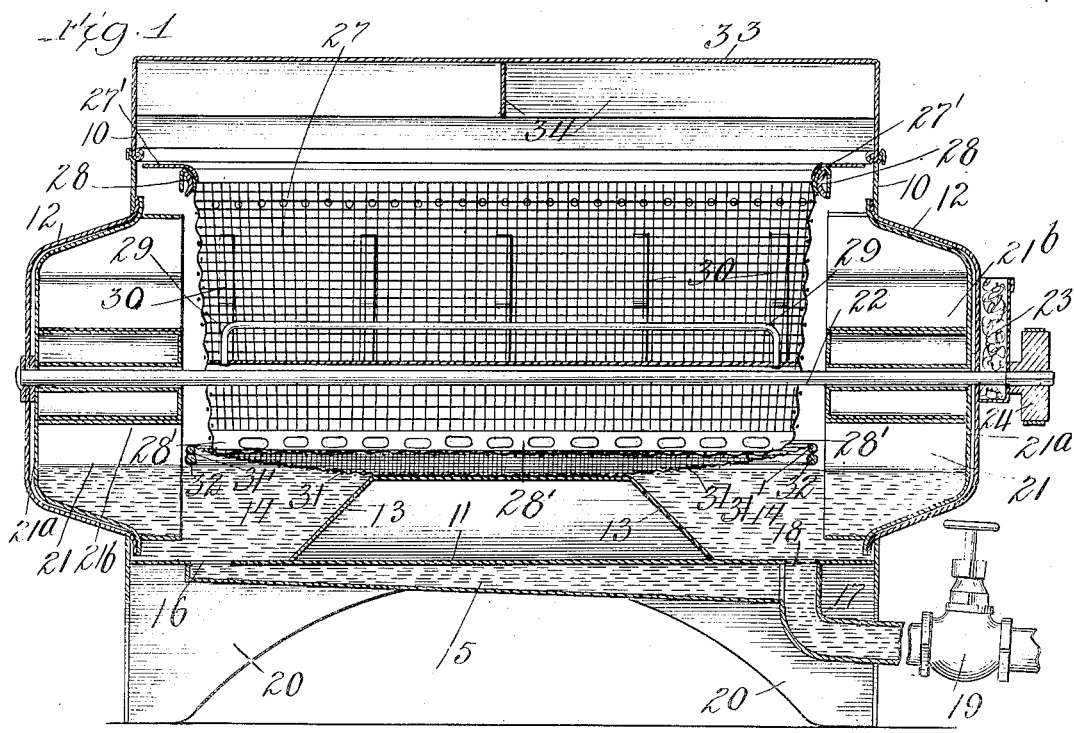
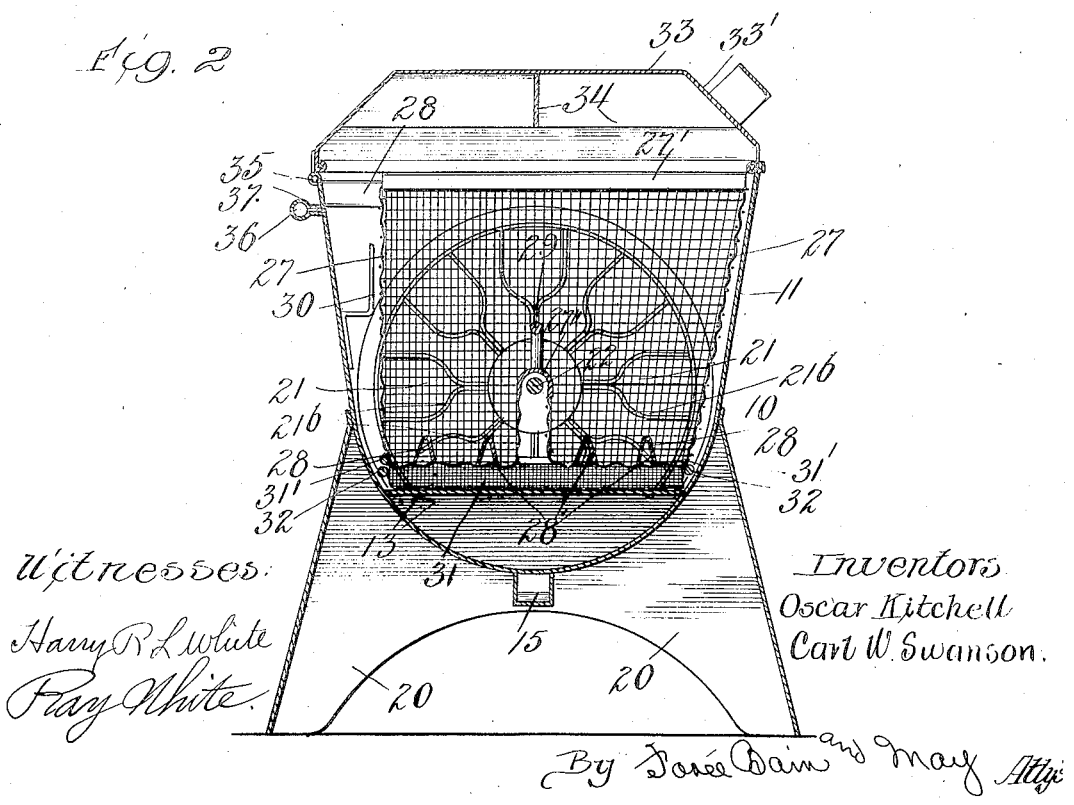
Witnesses:
Harry R. L. White
Ray White
Inventors
Oscar Kitchell
Carl W. Swanson
By Dorée Dain and May Attys No. 821,105. PATENTED MAY 22, 1906.
O. KITCHELL & C. W. SWANSON.
DISH WASHING MACHINE.
APPLICATION FILED JUNE 17, 1905.
2 SHEETS—SHEET 2.
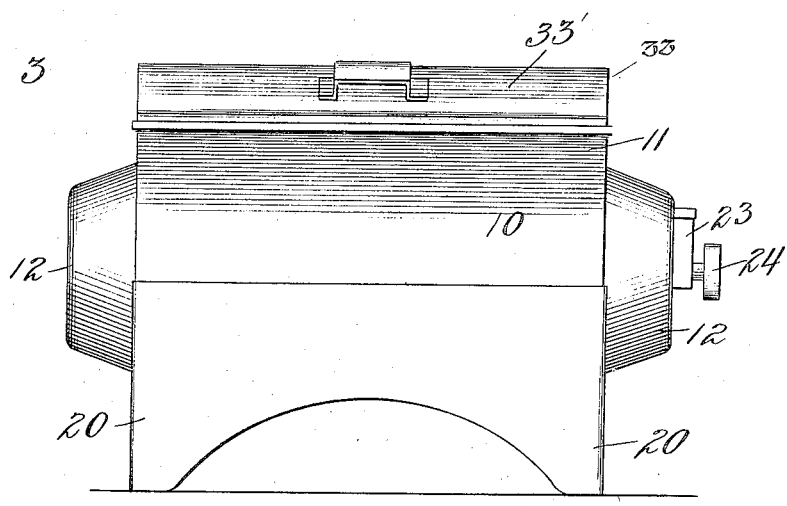
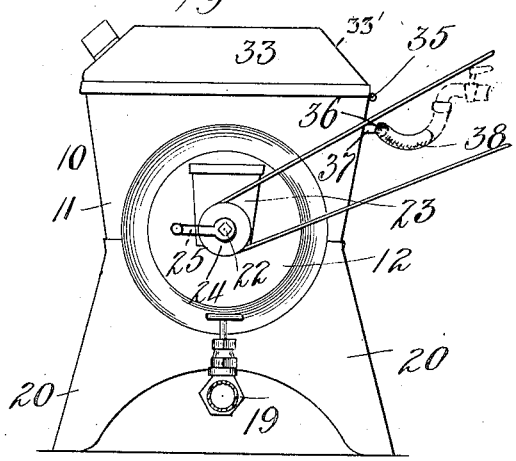
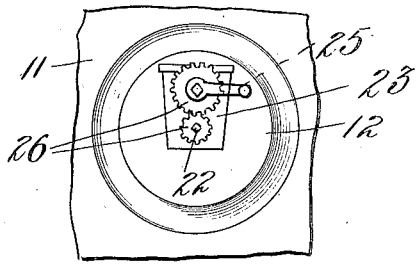
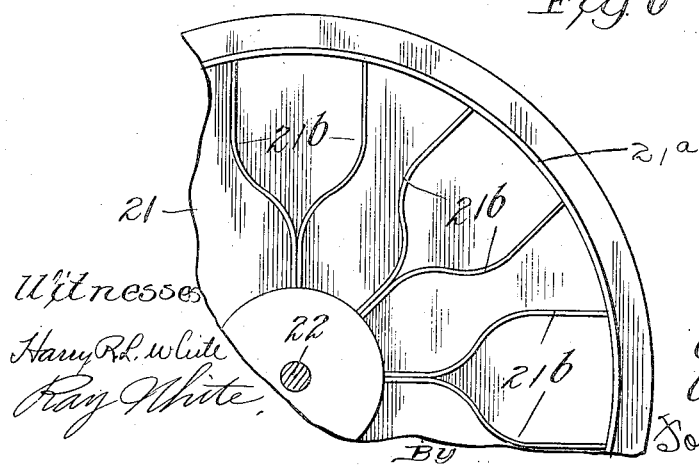
Witnesses
Harry R. L. White
Ray White
Inventors
Oscar Kitchell,
Carl W. Swanson,
By Josée Bain and May
Atty's

UNITED STATES PATENT OFFICE.

OSCAR KITCHELL AND CARL W. SWANSON, OF CHICAGO, ILLINOIS, ASSIGNORS, BY DIRECT AND MESNE ASSIGNMENTS, TO SAID SWANSON, GEORGE W. POWERS, AND SHERMAN W. PRINCE, OF CHICAGO, ILLINOIS.

DISH-WASHING MACHINE.

No. 821,105.      Specification of Letters Patent.      Patented May 22, 1906.

Application filed June 17, 1905. Serial No. 265,639.

*To all whom it may concern:*

Be it known that we, OSCAR KITCHELL and CARL W. SWANSON, of Chicago, in the county of Cook and State of Illinois, have invented certain new and useful Improvements in Dish-Washing Machines; and we hereby declare that the following is a full, clear, and exact description thereof, reference being had to the accompanying drawings, which form part of this specification.

Our invention relates to improvements in dish-washing machines, and has among its salient objects to provide a machine of the character described which is simple in construction, easy of manufacture, compact in form, and efficient in operation.

With a view to attaining these and other objects and to provide a machine of generally improved construction our invention consists in the features of improvement hereinafter more fully described, and specifically set forth in the claims.

In the drawings, wherein we have illustrated a practical embodiment of our invention, Figure 1 is a central longitudinal section through a machine. Fig. 2 is a transverse vertical section. Fig. 3 is an external side view. Fig. 4 is an exterior end view. Fig. 5 is a detail of a driving mechanism, and Fig. 6 is an enlarged detail of one of the blade-wheels.

Throughout the drawings like numerals of reference refer always to like parts.

Referring now to the drawings, 10 indicates in general the shell of a machine, comprising in general a casing-body, a cover completing the casing, and a suitable supporting-stand.

11 indicates in general the casing-body, which is preferably for convenience a round-bottomed receptacle having its sides divergently inclined to afford maximum room within the casing at the top thereof and at its ends provided with circular recesses 12, adapted to receive the blade-wheels hereinafter adverted to. A false-bottom structure 13 is preferably arranged within the receptacle 11 to provide near the ends thereof water-wells 14 14. This refinement may, however, be omitted and the water-well permitted to extend throughout the length of the casing.

A suitable passage is preferably provided to effect communication between the water-wells 14 14, and to this end a conduit member 15 is arranged below the curved bottom of the receptacle, at one end opening, as at 16, into one well 14, and at its other end opening into a drain-pipe 17, which in turn is in open communication, as through the port 18, with the other well 14. Said drain-pipe is provided with a suitable valve 19 for effecting the closure thereof to retain water in the wells. It will be understood that the receptacle 11 is preferably supported upon suitable legs, as illustratively shown at 20. At opposite ends of the casing 11 are disposed blade-wheels 21 21, preferably similar in all respects and mounted each with its side toward the dish-space therebetween, the wheels being preferably mounted upon a common shaft 22, extending longitudinally of the machine through the dish-space.

Each wheel is preferably of smaller diameter at its outer or rear side than at its inner or front side and may conveniently be of the shape shown in Fig. 1, the wheel being imperforately closed at its rear and about its periphery by a suitable wall 21ª and provided with two series of blades 21ᵇ of similar design, but oppositely disposed upon the wheel to form pairs. Such blades are so shaped and located that when the wheel is rotated in either direction one or the other set of blades entering the water-well at the lower side of the wheel will project the water upward and outward into the dish-space within the casing.

The blade shape herein shown we have found to be very advantageous, each blade providing a radial portion nearest the center of the wheel, a portion substantially parallel to said radial portion, but offset therefrom, extending to the periphery of the wheel, and a part connecting said two portions curved to a suitable compound curve to form a sort of water-carrying pocket. A pair of opposing blades may be likened in shape to a tuning-fork.

It will be understood that the shaft 22 may be driven in any suitable manner, and we have shown the one end thereof projecting through a stuffing-box 23 and provided with a pulley 24 to receive a power-belt. It will be understood, however, that in lieu of the pulley 24 might be employed a handle 25, either associated directly with the shaft 22, as shown in Fig. 4, or through the intermediary of gearing 26, as shown in Fig. 5.

In the space intermediate the confronting open-front face of wheels 21, which space we term the "dish-space," we provide a suitable receptacle for dishes, which may be variously constructed, but which we prefer shall be in the form of a basket. 27 represents, specifically, such a basket of open-wire mesh suitably supported, as by the engagement of a flanged edge 27' of the basket, with supporting-rods 28 28 extending across the casing adjacent the ends thereof. The said basket is provided in its bottom with an elevated ridge 27'', suitably disposed and shaped to overlie the shaft 22 when the basket is in operative position in the casing. To afford requisite strength and provide a means for holding the dishes against slipping within the basket, we may, if desired, provide longitudinal ribs 28' along the bottom of the basket 27, said ribs being preferably of sheet metal properly formed up and apertured to permit free circulation of water therethrough.

For the reception of knives, forks, and like tableware we preferably provide, at one side of the casing, cleats 30, suitably disposed to form a rack, and we preferably shape the side of the basket adjacent thereto to accommodate such cleats.

We preferably provide at a suitable point in the machine a fine screen to prevent the scraps, crumbs, and like refuse liable to accumulate in dish-water from entering the wells 14, from which the wheels 21 draw their supply of water. To this end we provide the fine-meshed screen or strainer 31, interposed between the false bottom 13 of the casing and the dish-receptacle 27. The screen 31 may be suitably braced, as by a surrounding frame 31', and supported in any convenient manner, as upon rods 32. Preferably the screen 31 extends from side to side of the casing and from a point contiguous one wheel to the other. The cover 33 of the casing may be of any suitable configuration, but preferably has inclined portions converging from the sides, as shown at 33', and ribs or splashers 34, extending lengthwise and crosswise of the cover, are preferably provided therein. It will be understood that the cover is preferably hinged to the body of the receptacle, as shown at 35, and is associated with the casing in such manner as to make water-tight joint therewith when closed. We also prefer to provide in conjunction with our device a means for spraying the dishes with water from extraneous sources to rinse the dishes, such means being herein shown as a pipe 36, extending along one side of the machine and opening thereinto by small apertures 37, the said pipe 36 being capable of connection in any suitable manner, as through a hose-coupling 38, with a suitable source of water-supply, illustrated in dotted lines in Fig. 4 as a faucet.

The operation of our improved device constructed as above described will be as follows: Dishes to be washed are placed in the receptacle 27, knives and like tableware being placed in the cleats 30 provided therefor. Now water of suitable temperature is introduced into the receptacle until the water reaches substantially the level indicated in Fig. 1. Now when power is applied to the shaft 22 to rotate the latter the wheels 21 are simultaneously rotated in like direction, dipping their blades into the adjacent water-wells 14. Consequently the water is carried upward by the pocket-like blades of the wheel and is thrown upward and outward in a sheet which appears to start at the surface of the water and extends fan-like to the top of the casing, the direction of throw being generally upward and inward, so that the water is projected into the dish-receptacle in the dish-space between the wheels. Water thus continuously thrown upon the dishes flows back through into the intercommunicating wells 14, the refuse from washing the dishes being caught in the fine screen or sieve 31 and prevented from flowing into the water-wells and being thrown against the dishes by the wheels. A suitable detergent powder may of course be mixed with the water, or a soap-bar may be placed in the casing in such position as to be reached by the water. When now the dishes are thoroughly cleansed, the dish-water may be drawn off from the casing by opening the valve 19 in the waste-pipe, and then the dishes may be rinsed by spraying the water into the casing through the spray-pipes 36 and apertures 37. Preferably such rinsing-water should be very hot, and if allowed to run off the heat of the casing is found to quickly dry the dishes, so that they need no hand-wiping. When the washing and rinsing are completed, the casing is opened, and the basket containing the dishes may be lifted out without removing the dishes therefrom.

While we have herein described in some detail an operative embodiment of our invention, which we believe to have many detail points of advantage, we do not desire to be understood as limiting our invention to the specific construction shown and described further than as specified in the claims, as it will be apparent that numerous changes might be made in the specific construction of our device without departure from the spirit and scope thereof.

Having thus described our invention, what we claim, and desire to secure by Letters Patent of the United States, is—

1. In a dish-washing machine, the combination with a casing providing a dish-space, and a water-space at a lower level than the dish-space, of a rotatable blade-wheel within the casing and without the dish-space, disposed with its side toward the dish-space, and arranged to throw water into the dish-space.

2. In a dish-washing machine, a casing providing a dish-space, and a water-well, a blade-wheel having an open side, disposed within the casing with its open side toward the dish-space, said wheel being arranged to dip into the water-well and adapted to throw water from the well into the dish-space.

3. In a machine of the character described, a casing providing a dish-space and a water-space, a shaft extending throughout the casing and blade-wheels on said shaft at opposite ends of the casing, each arranged to throw water from the water-space into the dish-space.

4. In a machine of the character described, a casing providing a dish-space and a water-space therebelow, a blade-wheel within the casing arranged transversely of the casing with its side toward the dish-space, said wheel extending into and out of the water-space, and said wheel being arranged when rotated to throw water from the well upward and inward into the dish-space.

5. In a machine of the class described, a casing providing a dish-space and a water-space, and a blade-wheel arranged transversely of the casing with its side toward the dish-space, extending into and without the water-space, and provided with a part closing its side away from the dish-space and a series of blades each comprising portions at different radial distances from the center of the wheel, disposed in substantial parallelism, but out of alinement, and a curved portion connecting said substantially parallel portions.

6. In a machine of the class described, a casing providing a dish-space and a water-space, a blade-wheel within the casing arranged transversely thereof, to present its side toward the dish-space, and extending into and without the water-space, said wheel having its largest diameter on the side adjacent the dish-space, and decreasing in diameter toward its other side, and being closed throughout its smaller side and periphery, and said wheel being further provided with blades each comprising substantially parallel, non-alining portions extending in a generally radial direction, and curved portions connecting said non-alining straight portions.

7. In a machine of the character described, a casing providing a dish-space and a water-space, confronting blade-wheels each disposed with its side toward the dish-space and arranged to throw water from the water-space into the dish-space, and means for simultaneously driving said blade-wheels.

8. In a machine of the character described, a casing providing a dish-space and a water-space, oppositely-disposed blade-wheels without the dish-space, arranged to present their sides toward the dish-space and adapted to throw water from the water-space into the dish-space, a shaft common to said wheels and means for rotating the shaft.

9. In a machine of the character described, a casing, a false bottom in said casing providing wells at opposite ends thereof, wheels at opposite ends of the casing arranged transversely thereof each to present its side toward the center of the casing, each of said wheels being arranged to dip into the well at its end of the casing and adapted to throw water from said well into the space intermediate the wheels, and means in said space intermediate the wheels for supporting dishes above the level of the water-well.

10. In a machine of the character described, a casing, a shaft extending through said casing, wheels mounted upon opposite ends of said shaft and disposed to throw water from the bottom of the casing into the space between said wheels, and means for supporting dishes in the space between said wheels above the bottom of the casing, comprising a bottom member having an elevated portion adapted to straddle the wheel-driving shaft.

11. In a machine of the character described, a casing providing a dish-space, wheels within the casing for throwing water from the bottom of said casing into said dish-space, and means for supplying a water-spray to the interior of said casing independent of and in addition to said wheels.

12. In a machine of the class described, the combination with a casing of wheels arranged therein, adapted to throw water from the bottom of the casing upon the dishes, and a sprayer 36, arranged at the top of the casing and adapted to be connected with an extraneous source of water-supply.

13. In a machine of the class described, the casing 11, the wheels 27 and the top 33 provided with the splash-ribs 34, substantially as described.

14. In a machine of the class described, a casing provided at its end with recesses 12 opening into the interior of the casing, wheels disposed in said recesses with their sides confronting each other, means for driving wheels simultaneously, and means for supporting said dishes between the wheels above the level of the water into which said wheels dip, substantially as described.

In testimony that we claim the foregoing as our own we affix our signatures in presence of two witnesses.

OSCAR KITCHELL.
    CARL W. SWANSON.

In presence of—
 FORÉE BAIN,
 GEORGE T. MAY, Jr.